(12) United States Patent
Hwang et al.

(10) Patent No.: US 7,072,395 B2
(45) Date of Patent: Jul. 4, 2006

(54) MEMORY CONTROL APPARATUS AND EFFICIENT SEARCH PATTERN FOR BLOCK-MATCHING MOTION ESTIMATION

(75) Inventors: Michael Y. T. Hwang, Richmond, CA (US); Chung-Ta Lee, Sunnyvale, CA (US); Yi Liu, Austin, TX (US)

(73) Assignee: ESS Technology, Inc., Fremont, CA (US)

( * ) Notice: Subject to any disclaimer, the term of this patent is extended or adjusted under 35 U.S.C. 154(b) by 419 days.

(21) Appl. No.: 09/910,684

(22) Filed: Jul. 20, 2001

(65) Prior Publication Data

US 2003/0016748 A1    Jan. 23, 2003

(51) Int. Cl.
*H04B 1/66* (2006.01)
(52) U.S. Cl. .................................. 375/240.12
(58) Field of Classification Search ........... 375/240.01, 375/240.02, 240.03, 240.04, 240.05, 240.06, 375/240.07, 240.12, 240.13, 240.24, 240.15; 348/699, 700, 718; 382/232, 236; 703/25; H04N 7/12; H04B 1/66
See application file for complete search history.

(56) References Cited

U.S. PATENT DOCUMENTS

| | | | | |
|---|---|---|---|---|
| 5,247,355 A | * | 9/1993 | Frederiksen | ............ 375/240.12 |
| 5,315,388 A | * | 5/1994 | Shen et al. | .................. 348/718 |
| 5,428,403 A | * | 6/1995 | Andrew et al. | ............. 348/699 |
| 5,541,661 A | * | 7/1996 | Odaka et al. | .......... 375/240.15 |
| 5,608,656 A | * | 3/1997 | Purcell et al. | ............... 708/203 |
| 5,731,850 A | * | 3/1998 | Maturi et al. | ................ 348/699 |
| 5,799,169 A | * | 8/1998 | Kalapathy | ..................... 703/25 |
| 5,987,178 A | * | 11/1999 | Anesko et al. | .............. 382/236 |
| 6,118,901 A | * | 9/2000 | Chen et al. | .................. 382/236 |
| 6,212,231 B1 | * | 4/2001 | Takano | ................... 375/240.24 |
| 6,690,727 B1 | * | 2/2004 | Mehta | .................... 375/240.12 |

* cited by examiner

*Primary Examiner*—Tung Vo
(74) *Attorney, Agent, or Firm*—Farjami & Farjami LLP

(57) ABSTRACT

A memory control apparatus for block-matching motion estimation and an associated search pattern for processing video sequence in real-time are described in this disclosure. The motion estimation subsystem utilizes a set of memory banks to store a section of the reference picture used for computing the differences between an underlying block and a spatially shifted reference block. The memory control apparatus derives the memory addresses for storing the reference picture region in the memory banks in such a way that a row or a column of data from the reference block can be accessed in parallel without wait. The row- or column-data are then made available to the parallel computation unit for computing the block difference in a single processing cycle. An associated spiral search pattern that covers the whole search region is also described that minimizes the required data access and consequently saves power consumption. Combined with a search-stop criterion, the search pattern will result in early search termination during the block-matching motion estimation process and consequently conserves more power.

19 Claims, 14 Drawing Sheets

| 00 | 01 | 02 | 03 | 04 | 05 | 06 | 07 |
|----|----|----|----|----|----|----|----|
| 10 | 11 | 12 | 13 | 14 | 15 | 16 | 17 |
| 20 | 21 | 22 | 23 | 24 | 25 | 26 | 27 |
| 30 | 31 | 32 | 33 | 34 | 35 | 36 | 37 |
| 40 | 41 | 42 | 43 | 44 | 45 | 46 | 47 |
| 50 | 51 | 52 | 53 | 54 | 55 | 56 | 57 |
| 60 | 61 | 62 | 63 | 64 | 65 | 66 | 67 |
| 70 | 71 | 72 | 73 | 74 | 75 | 76 | 77 |
| 88 | 81 | 82 | 83 | 84 | 85 | 86 | 87 |
| 90 | 99 | 92 | 93 | 94 | 95 | 96 | 97 |
| A0 | A1 | A2 | A3 | A4 | A5 | A6 | A7 |
| B0 | B1 | B2 | B3 | B4 | B5 | B6 | B7 |
| C0 | C1 | C2 | C3 | C4 | C5 | C6 | C7 |
| D0 | D1 | D2 | D3 | D4 | D5 | D6 | D7 |
| E0 | E1 | E2 | E3 | E4 | E5 | E6 | E7 |
| F0 | F1 | F2 | F3 | F4 | F5 | F6 | F7 |

Fig. 4

| BANK_0 | BANK_1 | BANK_2 | BANK_3 | BANK_4 | BANK_5 | BANK_6 | BANK_7 | BANK_8 | BANK_9 | BANK_A | BANK_B | BANK_C | BANK_D | BANK_E | BANK_F |
|---|---|---|---|---|---|---|---|---|---|---|---|---|---|---|---|
| 00 | 01 | 02 | 03 | 04 | 05 | 06 | 07 | 80 | 81 | 82 | 83 | 84 | 85 | 86 | 87 |
| 17 | 10 | 11 | 12 | 13 | 14 | 15 | 16 | 97 | 90 | 91 | 92 | 93 | 94 | 95 | 96 |
| 26 | 27 | 20 | 21 | 22 | 23 | 24 | 25 | A6 | A7 | A0 | A1 | A2 | A3 | A4 | A5 |
| 35 | 36 | 37 | 30 | 31 | 32 | 33 | 34 | B5 | B6 | B7 | B0 | B1 | B2 | B3 | B4 |
| 44 | 45 | 46 | 47 | 40 | 41 | 42 | 43 | C4 | C5 | C6 | C7 | C0 | C1 | C2 | C3 |
| 53 | 54 | 55 | 56 | 57 | 50 | 51 | 52 | D3 | D4 | D5 | D6 | D7 | D0 | D1 | D2 |
| 62 | 63 | 64 | 65 | 66 | 67 | 60 | 61 | E2 | E3 | E4 | E5 | E6 | E7 | E0 | E1 |
| 71 | 72 | 73 | 74 | 75 | 76 | 77 | 70 | F1 | F2 | F3 | F4 | F5 | F6 | F7 | F0 |

Fig. 6

| | BANK_0 | BANK_1 | BANK_2 | BANK_3 | BANK_4 | BANK_5 | BANK_6 | BANK_7 | BANK_8 | BANK_9 | BANK_A | BANK_B | BANK_C | BANK_D | BANK_E | BANK_F |
|---|---|---|---|---|---|---|---|---|---|---|---|---|---|---|---|---|
| | (00) | 01 | 02 | 03 | 04 | 05 | 06 | 07 | (80) | 81 | 82 | 83 | 84 | 85 | 86 | 87 |
| | 17 | (10) | 11 | 12 | 13 | 14 | 15 | 16 | 97 | (90) | 91 | 92 | 93 | 94 | 95 | 96 |
| | 26 | 27 | (20) | 21 | 22 | 23 | 24 | 25 | A6 | A7 | (A0) | A1 | A2 | A3 | A4 | A5 |
| | 35 | 36 | 37 | (30) | 31 | 32 | 33 | 34 | B5 | B6 | B7 | (B0) | B1 | B2 | B3 | B4 |
| | 44 | 45 | 46 | 47 | (40) | 41 | 42 | 43 | C4 | C5 | C6 | C7 | (C0) | C1 | C2 | C3 |
| | 53 | 54 | 55 | 56 | 57 | (50) | 51 | 52 | D3 | D4 | D5 | D6 | D7 | (D0) | D1 | D2 |
| | 62 | 63 | 64 | 65 | 66 | 67 | (60) | 61 | E2 | E3 | E4 | E5 | E6 | E7 | (E0) | E1 |
| | 71 | 72 | 73 | 74 | 75 | 76 | 77 | (70) | F1 | F2 | F3 | F4 | F5 | F6 | F7 | (F0) |

Fig. 7a

| | BANK_0 | BANK_1 | BANK_2 | BANK_3 | BANK_4 | BANK_5 | BANK_6 | BANK_7 | BANK_8 | BANK_9 | BANK_A | BANK_B | BANK_C | BANK_D | BANK_E | BANK_F |
|---|---|---|---|---|---|---|---|---|---|---|---|---|---|---|---|---|
| ↑ | (35) | (45) | (55) | (65) | (75) | (05) | (15) | (25) | (B5) | (C5) | (D5) | (E5) | (F5) | (85) | (95) | (A5) |
| | 00 | 01 | 02 | 03 | 04 | (05) | 06 | 07 | 80 | 81 | 82 | 83 | 84 | (85) | 86 | 87 |
| | 17 | 10 | 11 | 12 | 13 | 14 | (15) | 16 | 97 | 90 | 91 | 92 | 93 | 94 | (95) | 96 |
| | 26 | 27 | 20 | 21 | 22 | 23 | 24 | (25) | A6 | A7 | A0 | A1 | A2 | A3 | A4 | (A5) |
| | (35) | 36 | 37 | 30 | 31 | 32 | 33 | 34 | (B5) | B6 | B7 | B0 | B1 | B2 | B3 | B4 |
| | 44 | (45) | 46 | 47 | 40 | 41 | 42 | 43 | C4 | (C5) | C6 | C7 | C0 | C1 | C2 | C3 |
| | 53 | 54 | (55) | 56 | 57 | 50 | 51 | 52 | D3 | D4 | (D5) | D6 | D7 | D0 | D1 | D2 |
| | 62 | 63 | 64 | (65) | 66 | 67 | 60 | 61 | E2 | E3 | E4 | (E5) | E6 | E7 | E0 | E1 |
| | 71 | 72 | 73 | 74 | (75) | 76 | 77 | 70 | F1 | F2 | F3 | F4 | (F5) | F6 | F7 | F0 |

Fig. 7b

| BANK_0 | BANK_1 | BANK_2 | BANK_3 | BANK_4 | BANK_5 | BANK_6 | BANK_7 | BANK_8 | BANK_9 | BANK_A | BANK_B | BANK_C | BANK_D | BANK_E | BANK_F |
|---|---|---|---|---|---|---|---|---|---|---|---|---|---|---|---|
| 00 | 01 | 02 | 03 | 04 | 05 | 06 | 07 | 80 | 81 | 82 | 83 | 84 | 85 | 86 | 87 |
| 17 | 10 | 11 | 12 | 13 | 14 | 15 | 16 | 97 | 90 | 91 | 92 | 93 | 94 | 95 | 96 |
| 26 | 27 | 20 | 21 | 22 | 23 | 24 | 25 | A6 | A7 | A0 | A1 | A2 | A3 | A4 | A5 |
| 35 | 36 | 37 | 30 | 31 | 32 | 33 | 34 | B5 | B6 | B7 | B0 | B1 | B2 | B3 | B4 |
| 44 | 45 | 46 | 47 | 40 | 41 | 42 | 43 | C4 | C5 | C6 | C7 | C0 | C1 | C2 | C3 |
| 53 | 54 | 55 | 56 | 57 | 50 | 51 | 52 | D3 | D4 | D5 | D6 | D7 | D0 | D1 | D2 |
| 62 | 63 | 64 | 65 | 66 | 67 | 60 | 61 | E2 | E3 | E4 | E5 | E6 | E7 | E0 | E1 |
| 71 | 72 | 73 | 74 | 75 | 76 | 77 | 70 | F1 | F2 | F3 | F4 | F5 | F6 | F7 | F0 |

Fig. 8

MEMORY CONTROL APPARATUS AND EFFICIENT SEARCH PATTERN FOR BLOCK-MATCHING MOTION ESTIMATION

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

1. Field of Invention

The invention relates to the field of video sequence processing and more specifically to memory control for a motion estimation processor and associated search pattern.

2. Description Relative to the Prior Art

In a typical video sequence, neighboring pictures represent snapshots of a scene with a very short time interval. There is a great amount of similarity between consecutive pictures, particularly in the background areas. A well-known technique in video sequence coding to reduce the bit rate, called interframe coding, is to transmit the differences between pictures or frames. In an ideal situation, this technique can avoid the need to repeatedly transmit the information corresponding to the static background. There is a well-known advancement in video sequence coding, called the Block Matching Algorithm (BMA) for motion estimation. The BMA was developed by J. R. Jain and A. K. Jain, and the details are described in their publication entitled "Displacement Measurement and Its Application in Interframe Image Coding," in IEEE Trans. on Communications, vol-COM-29, pp. 1799–1808, December 1981.

The objective of the BMA is to further improve the efficiency of interframe coding by taking into consideration of effect of object movement in the video sequence. Instead of forming the direct difference between consecutive frames, the BMA shifts the previous picture to compensate the object movement and then takes the difference between the current picture and the shifted previous picture. Such a coding system is commonly called motion-compensated interframe coding.

In practice, it would be very computationally difficult to derive the horizontal and vertical displacements, called the motion vector, for an arbitrarily shaped object. The BMA simplifies the situation by dividing the picture into small rectangular blocks and assuming that the object undergoes a planar movement only. This simplified model works satisfactorily when the block is inside the object boundary and the time interval between two pictures is small enough so that any movement (3D rotation or spin) can be reasonably modeled as a planar movement. Due to the effectiveness of bit rate reduction, the BMA and its variations have been widely used in various video coding standards. The BMA has to compute the block difference $BD_{k,l}(x,y)$ defined as:

$$BD_{k,l}(x, y) = \sum_{m=0}^{M-1} \sum_{n=0}^{N-1} Dist(I_{k,l}(m, n) - I'_{k,l}(m - x, n - y)),$$

where $I_{k,l}(m,n)$ is the current block to be motion compensated, $I'_{k,l}(m,n)$ is the corresponding reference block from a previously reconstructed picture, $Dist(\bullet,\bullet)$ is a distortion measurement, M and N are the horizontal and vertical dimensions of the block respectively, (x,y) is the displacement, and k and l are the block indexes in the horizontal and vertical directions. In practice, either the absolute value or squared value has been often used as the distortion measure. The BMA searches a region in the previous picture corresponding to the underlying block in the current picture. The size of the search region, also called a search window, depends on the anticipated largest displacement between two pictures. In order to find the best match, every location in the search window has to be processed. In other words, the BMA computes and compares $BD_{k,l}(\bullet,\bullet)$ for all (x,y) in the window and selects the (x,y) that achieves the minimum block distortion as the motion vector for the block.

While the BMA is very useful for video coding, its computational complexity is extremely high. The complexity for calculating the block difference is proportional to MN, where M and N are the dimensions of the block. If the search region covers from −I to +I pixels horizontally and from −J to +J pixels vertically, the total number of locations to be searched is (2I+1)(2J+1). A straightforward implementation would search every location in the window and this method is referred to as a "full" search. The total number of computations required for each block is roughly proportional to 4IJMN. It would be extremely challenging to perform this task in real time especially for large search windows required for high quality video sequences.

Over the years, there have been sizable development activities in the area of "fast block matching algorithm", which address the issue of reducing the number of required search locations. In general, such methods start out with a small number of candidate locations including the original location and compute the block difference for each candidate. Based on the outcomes, it either moves to a new location or stays in the original location, depending on whichever results in the smallest block difference. If a new location results in the smallest block difference, the new search origin is moved to this new location and the process repeats. If the original location results in the smallest block difference, it narrows the search area by examining the surrounding locations closer than previous candidate locations. If the search area has been reduced to a minimum or the block difference is smaller than a pre-determined threshold, the search stops.

The fast search algorithms can substantially reduce the number of searches. However, sometimes they may miss the best match and have a negative impact on the coding efficiency. Among the fast search algorithms, the well-known "three-step search" was developed by T. Koga, et al, described in the publication entitled "Motion-compensated Interframe Coding for Video-Conferencing," in Proceedings of IEEE National Telecommunication Conference (New Orleans, La.), pp. G5.3.1–G5.3.5, November 1981. The three-step search has shown the capability to reduce the number of searches by a factor of more than 10 with some loss in coding efficiency. The three-step search only covers a small search window in the original publication. It is possible that the three-step search could be expanded to cover larger search windows. However, the coding efficient probably will be greatly compromised. The three-step search and its variations are more popular for software- or DSP-based implementations than the hardware-based implementations. Nevertheless, dedicated hardware for the three-step search has also been reported, such as the invention in U.S. Pat. No. 6,160,850 and the publication by T-H Chen entitled "A Cost-Effective Three-Step Hierarchical Search Block-Matching Chip for Motion Estimation," in IEEE Journal of Solid State Circuits, vol. 33, no. 8, August 1998.

There is another category of approaches to solving the high computational complexity issue by using massive parallel processing elements, which is a hardware solution. Due to the advancement in VLSI technology, it becomes more affordable to incorporate multiple processing elements on a single chip to perform the same task in parallel. The computation for block difference consists of computations of difference for individual pixels within the block. It has been long recognized as an ideal place to utilize parallel processors and there have been many technical publications on this subject over the years. One of the frequently referenced publications is entitled "A Family of VLSI Design for the Motion Compensation Block-Matching Algorithm", by K-M Yang, et al, in IEEE Transaction on Circuits and Systems, vol. 36, no. 10, pp. 1317–1325, October 1989. This publication presents a modular VLSI architecture based on data-flow design that allows sequential data inputs, but performs parallel processing. Another frequently referenced article is entitled "A Novel Modular Systolic Array Architecture for Full-Search Block Matching Motion Estimation," by Yeo and Hu in IEEE Transaction on Circuits and Systems for Video Technology, vol. 5, no. 5, pp.407–416, October 1995. They present a scalable systolic architecture that allows cascading multiple parallel processors of smaller size to form parallel processors of larger size. Both of the above mentioned techniques use sequential input data that matches with the pipelined processing of their system architecture. Furthermore, Yeo and Hu's method is intended to deal with smaller search windows since a search window much larger than the block size would complicate the interconnections among parallel processors.

The VLSI fabrication technology today is capable of squeezing millions of transistors into a single chip. It becomes more affordable to utilize one processing unit corresponding to each pixel in a block for computing the block difference in order to achieve the maximum possible processing speed. In a conventional parallel processor approach to high-speed motion estimation, the reference memory arrangement is not optimized for the situation using full processing units. Also, it is not optimized to conserve power consumption. Though the conventional approach is not optimized for memory access speed, it may be adequate for some real-time applications where the search window is relatively small, for example, from −16 to +16 pixels in both horizontal and vertical directions. If the search window is extended by a factor of 3, i.e., from −48 to +48, in both the horizontal and vertical direction, the number of searches increases roughly to 32, or 9 times as many. To accommodate the search over large windows in real time, it is necessary to employ more and more processing elements in parallel. Associated with a search over large windows is the increased number of memory accesses to the reference picture, which will result in much higher power consumption. It becomes very crucial for the commercial success of this block-matching motion estimation subsystem to achieve high speed and to conserve power.

BRIEF SUMMARY OF THE INVENTION

The present invention uses a staging memory which allows the block of pixels being used in a search pattern to be updated by loading the pixels in parallel in one cycle. The pixels are rearranged when they are loaded into the staging memory, so they can be accessed in parallel when they are moved to the temporary memory holding the block of pixels to be compared in the processing unit. A search pattern is used which only needs a single cycle, parallel access to update the block of pixels.

In one embodiment, the temporary memory is a two dimensional shift register, and the parallel access involves shifting either a row or a column into the shift register. By using a spiral pattern or similar search pattern, the block of pixels only needs to be shifted by a single row or column for each new comparison. The staging memory, consisting of a number of memory banks, is loaded with the pixels rearranged so that pixels from a single column are spread out so that an entire column can be read in parallel.

The objectives of the invention are achieved by the combination of memory control apparatus, 2D (two-dimensional) shift registers, and a spiral search pattern. The memory control apparatus manages the data access from dedicated memory banks and passes the needed row or column data to the parallel computing unit. The memory banks provide temporary storage space for the reference blocks for the corresponding underlying block. An address translation algorithm is incorporated into the memory control apparatus to allow the needed column or row data to be accessed simultaneously to avoid the pipeline delay in a typical sequential approach. The newly available column or row data combined with those already available constitute all the needed data for a reference block.

Consequently, the parallel processing unit can perform the block-difference computation for all pixels in the block simultaneously.

This single cycle access to a new column or row data is only valid if the search location is shifted each time by only 1 pixel horizontally or vertically throughout the whole search region. The commonly used raster scan pattern will exhibit an abrupt jump when it comes to the end of one line and moves to the beginning of the next line. A spiral search pattern that has full coverage of all pixels within a square search window was developed in this invention to meet the requirement of data continuity for the search. The spiral search pattern is further modified for rectangular search windows. It has been a common practice to stop the search when a good match between the underlying block and a reference block is found. For typical video sequences, this spiral pattern often results in a satisfactory match during the first few search steps. When a search stop criterion is introduced, the spiral search pattern often results in early termination and avoids further search. Consequently, the disclosed invention not only achieves the desired high-speed operation, it also conserves power.

BRIEF DESCRIPTION OF THE DRAWINGS

FIG. 4 is an array illustrating the 2D indexes for a 8×16 block.

FIG. 6 is a diagram illustrating how a block of data is stored in the memory banks. In this example, each column of data is spread over 16 memory banks and the next column is circular shifted to the right by 1 pixel.

FIG. 7a is a diagram illustrating a column readout of the new column data needed for FIG. 2, which can be simultaneous read out from the 16 memory banks.

FIG. 7b is a diagram similar to FIG. 7a illustrating a read-out requiring a re-ordering.

FIG. 8 is a diagram illustrating the reading of row data, which can be simultaneous read out from the 16 memory banks.

DETAILED DESCRIPTION OF THE INVENTION

Figure 1:
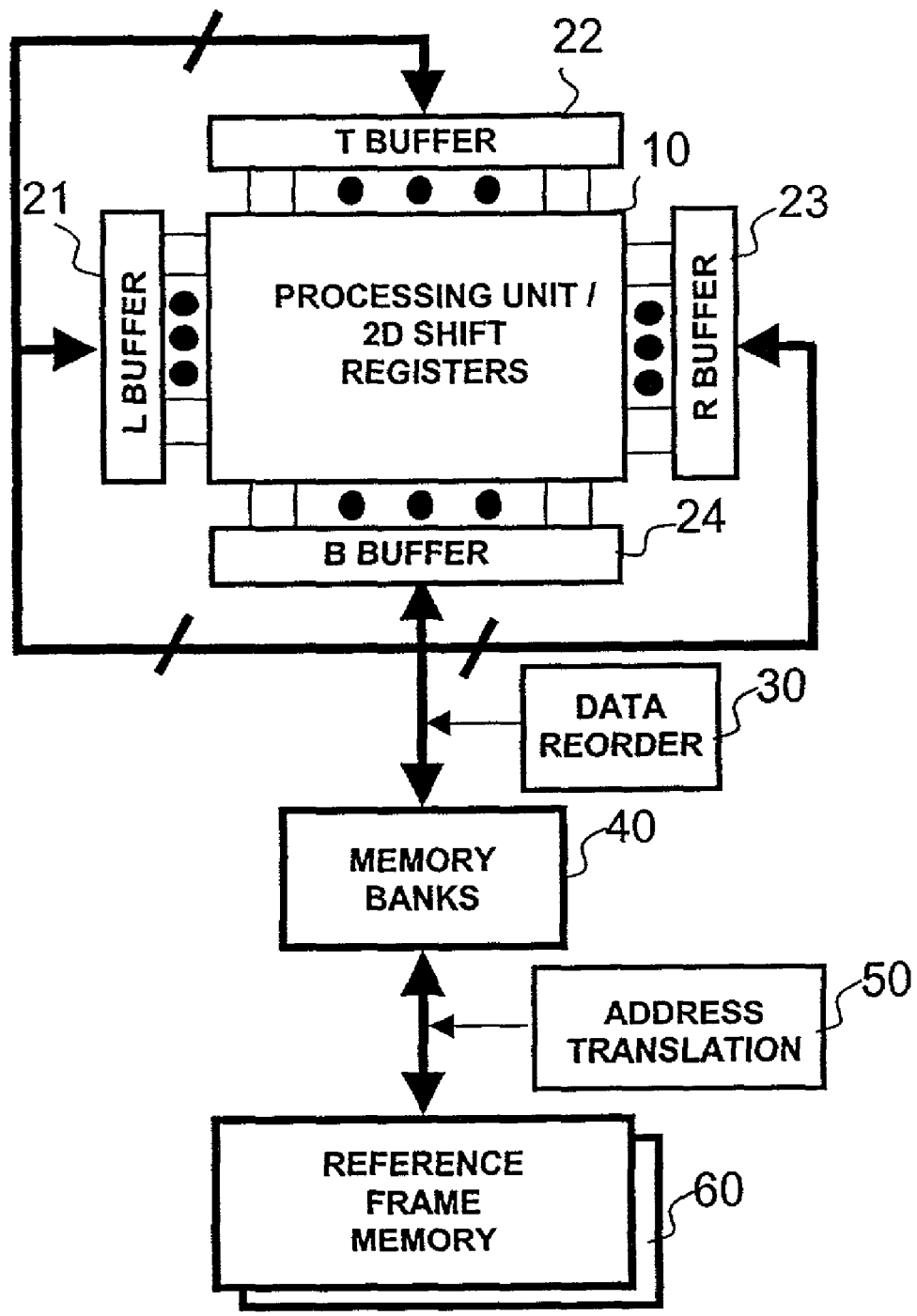
FIG. 1 is a block diagram of a preferred embodiment of this invention. The subsystem comprises a processing unit with 2D shift registers and four buffers, memory banks, a reference frame memory, an data reorder control, and an address translation control.

The invention can be incorporated into a video coding system to achieve high-speed implementation of full-search, block-matching motion estimation with a large search window, and to conserve power by minimizing the memory access. FIG. 1 illustrates a preferred embodiment of this invention that consists of the processing unit/2D shift registers 10, buffers 21, 22, 23 and 24, memory banks 40 (SRAM in one embodiment) with associated data reorder control unit 30, and reference frame memory 60 associated with an address translation control unit 50. The previously reconstructed pictures are stored in the reference frame memory. The processing unit has M×N processing elements (PEs) so that each pixel in the block can be assigned a dedicated PE. One objective of this invention is to optimize the processing speed by making all required input data available to the PEs quickly and simultaneously, instead of pixel by pixel, column by column, or row by row.

The implementation of the PE is a known art and a conventional implementation can be adopted. Each PE receives two input data, one from the underlying block and one from a shifted reference block. The underlying block is loaded into memory elements separate from the 2D shift registers in block 10, and each memory element is connected to one of the PEs. During the process of searching for the best match for the block, the input to the PE corresponding to the underlying block remains the same while the input corresponding to the reference block is changed for each location being searched. Therefore, efficient access of reference blocks during a search was carefully examined in the present invention in order to achieve the objective. The 2D shift registers are used to store the shifted reference block. In one embodiment, an 8×16 2D shift register is used. When a desired reference block is properly stored in the 2D shift registers, the processing unit is ready to perform the block difference computation in a parallel fashion by reading the entire reference block data simultaneously. Now, the issue becomes how to efficiently move a reference block into the 2D shift registers to achieve the goals of high speed and power conservation. In order to explain how the objective is accomplished by this preferred embodiment, we illustrate the reference block data access requirement for the search that moves from one location to the next.

Figure 2:
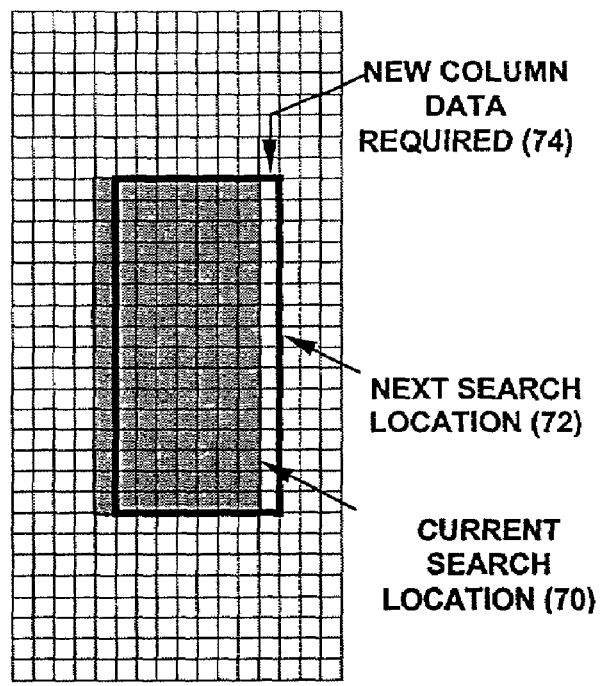
FIG. 2 is a diagram illustrating a search moving from the current location (as indicated by the gray rectangle) to the right by 1 pixel as indicated by the rectangular box enclosed by the thick lines. The new data needed for the search is the outmost column of the next reference block.

FIG. 2 illustrates a scenario where the search moves from the current location, as indicated by the gray rectangle 70, to the right by 1 pixel, as indicated by a rectangular box with thick boarder lines 72. For the illustration purpose, an 8×16 block size has been chosen without loss of generality. Any other block sizes, such as 16×16, 16×8, and 8×8, can be used as well. When the current reference block is searched, all the data in the gray box 70 are in the 2D shift registers. The search at the next location needs some new data corresponding to the first column 74 on the right of the rectangular box. If this new column data can be brought to the R buffer 23 in FIG. 1, a left shift operation on the 2D shift registers will position all the pixels in the correct place for the next search.

Figure 3:
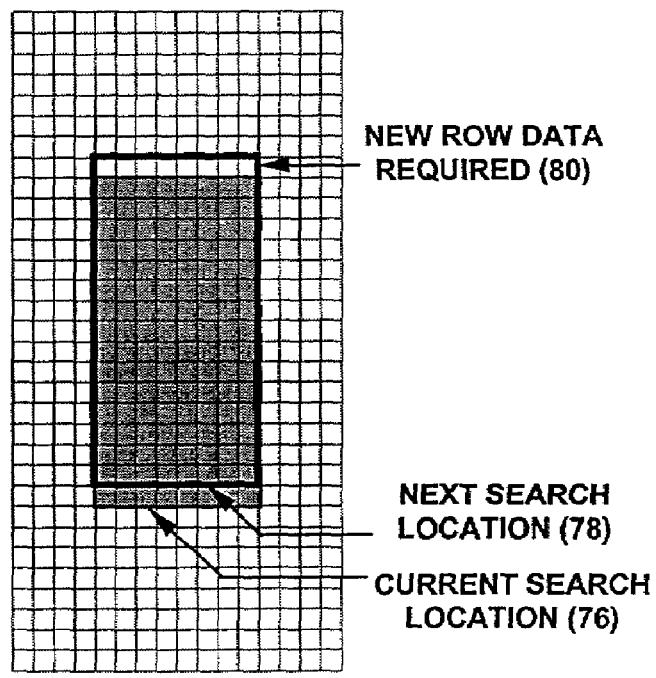
FIG. 3 is a diagram illustrating a search moving from the current location (as indicated by the gray rectangle) upward by 1 pixel as indicated by the rectangular box enclosed by the thick lines. The new data needed for the search is the top row of the next reference block.

FIG. 3 illustrates the search moving from the current location upward by 1 pixel. The current reference block 76 is shown as the gray rectangle and the new reference block 78 is shown as the rectangular box with thick boarder lines. The new data needed for the search at the next location is the top row 80 of the new reference block. If the data corresponding to the top row of the new reference box can be transferred to the T buffer 22 of FIG. 1, a down shift operation on the 2D shift register will position all the pixels in the correct place for the next search. Similarly, the L buffer 21 can be used for the next search to the left by 1 pixel and the B buffer 24 can be used for the next search downward by 1 pixel.

Based up the discussion above, it becomes clear that the 2D shift registers and associated buffers in the preferred embodiment can make motion estimation computation extremely efficient if the next search location is moved by 1 pixel right, left, up or down from the current position. In order to achieve this goal, there are two tasks that have to be accomplished. One task is to develop a memory structure and associated memory control that can efficiently supply the required column or row data needed for the next search mentioned above. The other task is to form a search pattern that moves only 1 pixel horizontally or vertically and covers the entire search window. The memory banks along with the data reorder control and the address translation control in the preferred embodiment are capable of accomplishing the first task. To illustrate how the memory banks achieve the efficient data access, let us examine its structure and how the data is stored in it. Again, we assume the 8×16 block size has been chosen without loss of generality. A total of 16 memory banks 40 are used to store the blocks of the previously reconstructed picture corresponding to the underlying block in the current picture and its surrounding blocks. The number of memory banks, 16 in this case, corresponds to whichever is larger between the block vertical size (16) and horizontal size (8).

The 2D indexes, 00 to F7 in the hex format, referring to the location of data within an 8×16 block, are illustrated in FIG. 4. In order to perform the search, an area of data from the previously reconstructed picture corresponding to the area around the underlying block are needed and stored in the memory banks for quick access. The size of the reference area depends on the intended search size. It is reasonable to assume that the possible object movement is symmetrical horizontally and vertically. Therefore, the extent of the search is always symmetrical as well. If the search in the horizontal direction may go as far as I pixels to the right, it will also search to the left as far as I pixels. The same fashion is applied to the vertical direction as well. In the preferred embodiment of this invention, the extent of search is chosen to be multiples of block size. For the block size of 8×16, the search window will be −8 to +8, −16 to +16, or −24 to +24, etc., horizontally and −16 to +32, or −48 to +48, etc., vertically. By doing so, reference data are moved into the memory banks in a block-by-block fashion that is easier to implement the memory control.

Figure 5:
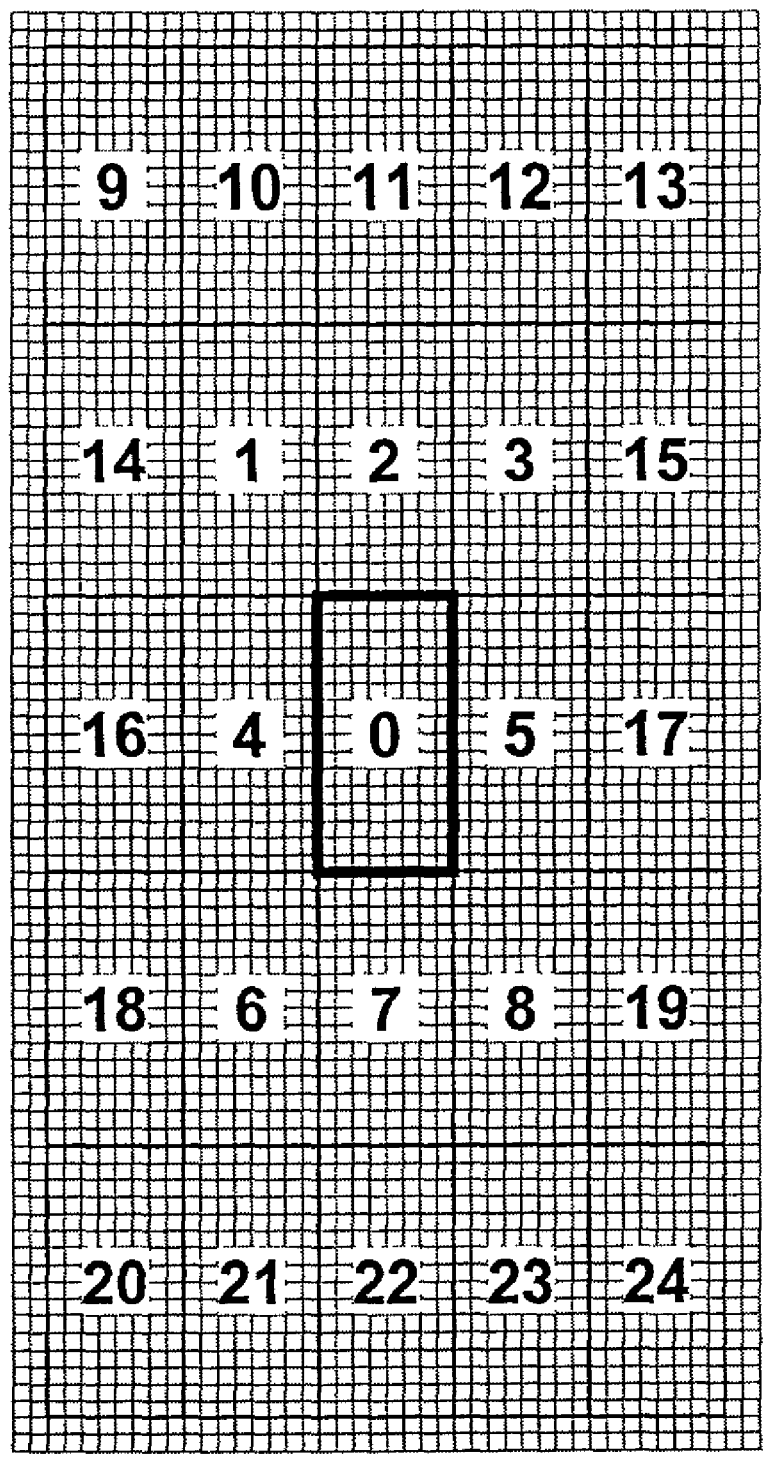
FIG. 5 is a diagram illustrating the reference blocks used for block matching motion estimation with a horizontal search range of 2 times of the block width and a vertical search range of 2 times of the block height. The block size of 8×16 is used as an example. A total of 25 reference blocks are required.

FIG. 5 illustrates the reference data required for the search from −16 to +16 horizontally and −32 to +32 vertically. A total of 25 blocks from the reference picture need to be transferred into the memory bank for computing the best displacement. Later on, we will describe an efficient search pattern that starts the search from the center block and goes outward. When a good match is found, it will terminate further search. Therefore, the block data, particularly those in the outer area of the search window, do not have to be in the memory banks, until they are called upon.

Next, we examine how the block data is stored in the memory banks. As described earlier, either a new column or row is needed to compute the block difference when the search moves horizontally or vertically by 1 pixel. Therefore, the goal of the data arrangement in the memory banks is to make the needed column or row data accessible efficiently. FIG. 6 illustrates the data arrangement in the Memory Banks that allows a column data or a row data accessible in parallel. Each of the columns is a separate memory bank, for a total of 16 memory banks. As can be seen, the first row of 8 starts at 00 and ends at 07, followed by a row from 80–87. The second row is shifted over 1, with the last pixel, 17, at the beginning, then progressing from 10–16. The third row is shifted twice, with the first two pixels being 26 and 27, followed by 20–25. Each of the second and third rows also has a second set of 8 pixels, also shifted by one (97) and two (A6, A7) pixels, respectively. Comparing this to the standard arrangement of FIG. 4, it can be seen that the bottom half has been added horizontally, to arrange the pixels to break up the 8×16 grouping into two 8×8 groupings arranged as a 16×8 grouping. Also, each row after the 1st is shifted. The effect of the regrouping is to allow two rows to be accessed at once (for a cross-block boundary, as will be described below in connection with FIGS. 9 and 11). The effect of the shifting is to allow an entire column to be read out in parallel, one pixel from each bank, rather than having the whole column (00, 10, 20, 30, 40, 50, 60, 70) in a single bank, where it would have to be read out serially.

FIG. 7a shows the example of reading the next column needed for column 74 of FIG. 2. The pixel data to be read is circled at the top of FIG. 7a. Notice that the shifting allows all of these to be read in parallel, in a single cycle. In the arrangement of FIG. 4, these would all be in the first column, and require 16 serial reads.

Now we examine the example of reading the column data (05, 15, 25, . . . , D5, E5, F5)$^t$ from the memory banks into the R buffer 23 of FIG. 1, where ( . . . )$^t$ indicates the transpose of the row data. As shown in FIG. 7b, the desired 16 pixels from the corresponding column, as circled at the top of the figure, can be read out from the memory banks in a single read cycle. Since only one data item has to be read out from each memory bank, there is no need to wait for sequential access. The column data available from memory bank 0 through memory bank F are pixels at 35, 45, 55, 65, 75, 05, 15, 25, B5, C5, D5, E5, F5, 85, 95, and A5. However, unlike the example of FIG. 7a for the 1st column, the shifting to allow parallel access has resulted in these being read out in a pattern that is not in sequential order. Thus, data reorder unit 30 rearranges the sequence to start at 05 and end at F5. The data reorder control will manage to put the column data into the R buffer in the correct sequence. This can be done, in one embodiment, by using crossbar switches to connect the data output from bank 5 (data 05) to the data output from bank 0, etc.

Now let's examine an example where row data, (F0, F1, . . . , F7) is needed corresponding to the case in FIG. 3. As evidenced by the circled pixels in FIG. 8, the 8 pixels corresponding to the desired row are available from memory bank 0 through memory bank 7. Again, since only one data has to be read out from each memory bank, there is no need to wait for sequential access. The row data from the memory banks needs to be reordered before they are transferred into a corresponding Buffer.

Figure 9:
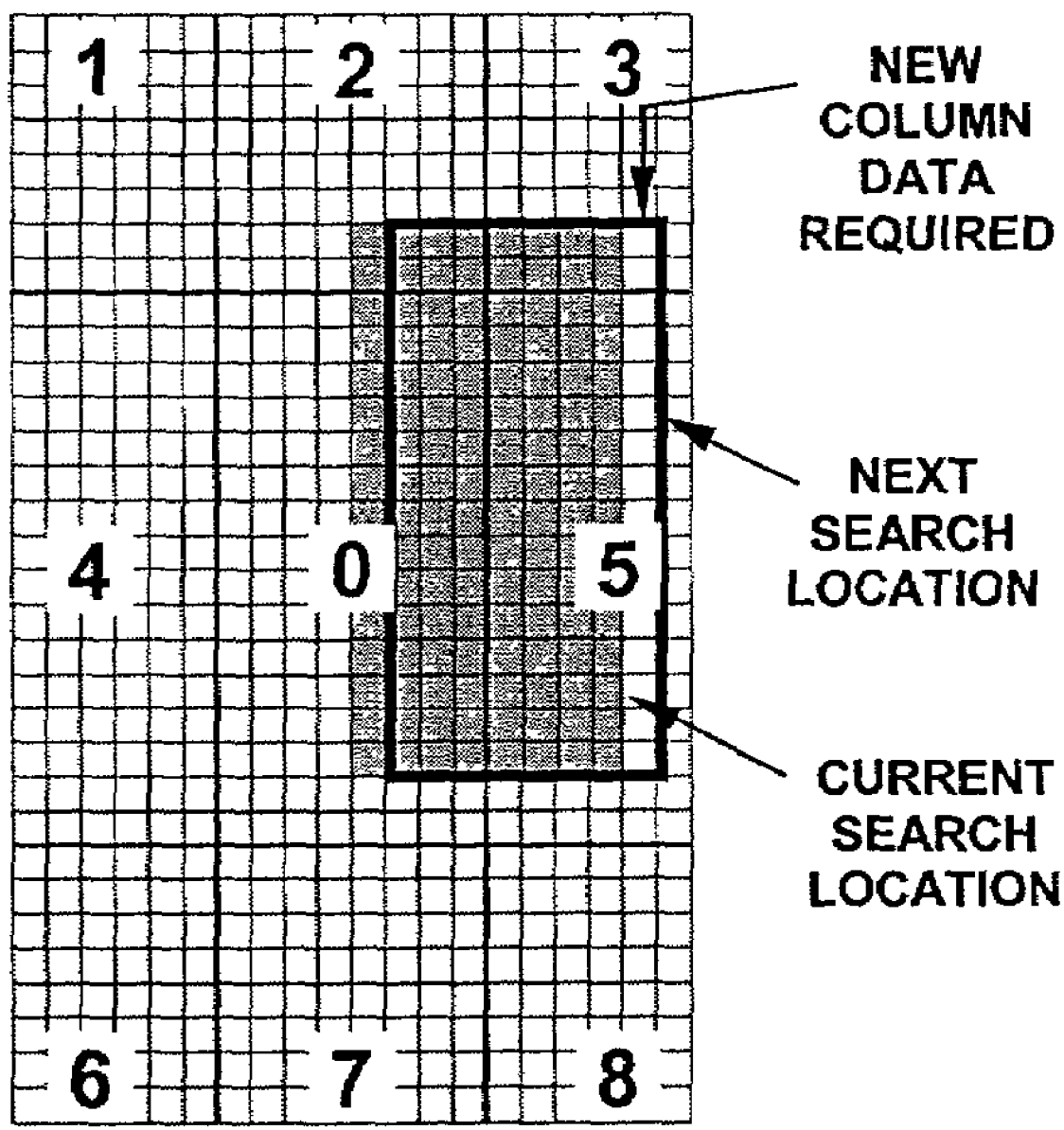
FIG. 9 is a diagram illustrating a search position where new column data across 2 blocks (block #3 and block #5) are needed for the search.
Figure 10:
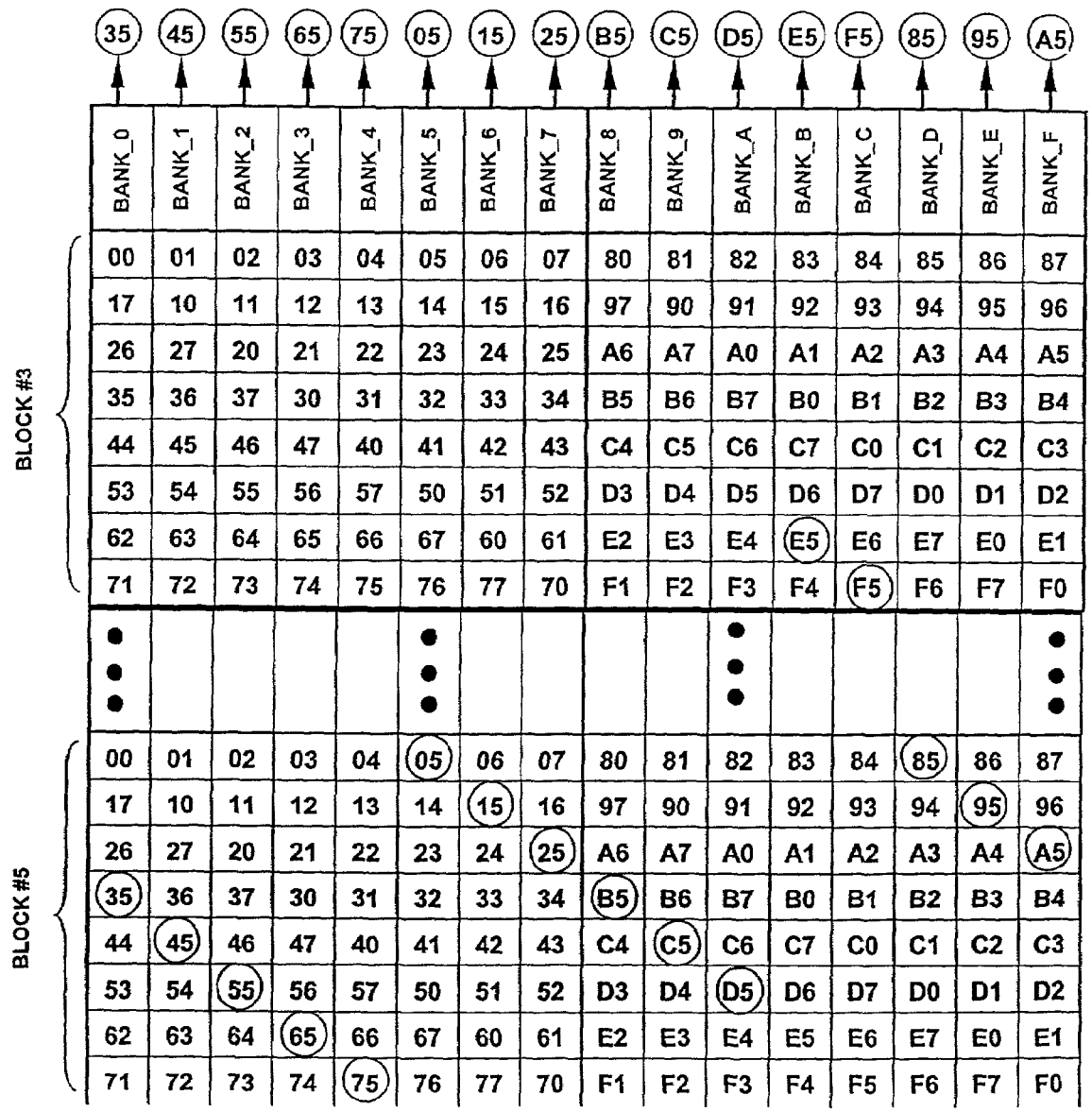
FIG. 10 is a diagram illustrating the needed new column data across 2 blocks (block #3 and block #5) for the search position of FIG. 9.

The above two examples only showed the situation where the column or row data are from a single block. However, along the search pattern, the needed column data or row data may cross the block boundary. FIG. 9 illustrates the case where the column data (05, 15, 25, . . . , D5, E5, F5)$^t$ for the reference block comes from block #3 (E5,F5) block #5 (05, 15, . . . , C5, D5)$^t$. FIG. 10 illustrates the parallel accessibility of the column data corresponding to the new column in FIG. 9.

Figure 11:
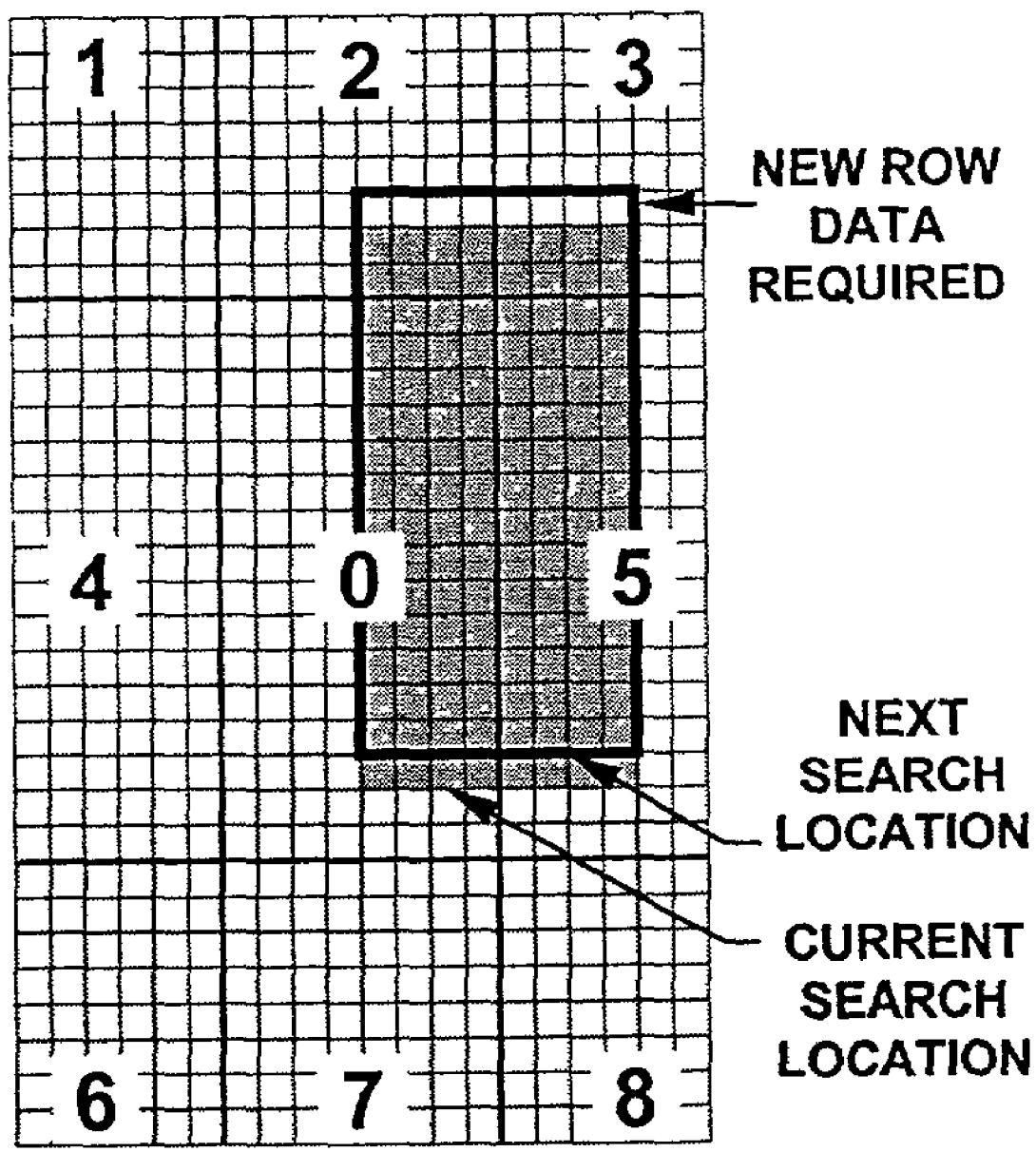
FIG. 11 is a diagram illustrating a search position where new row data across 2 blocks (block #2 and block #3) are needed for the search.
Figure 12:
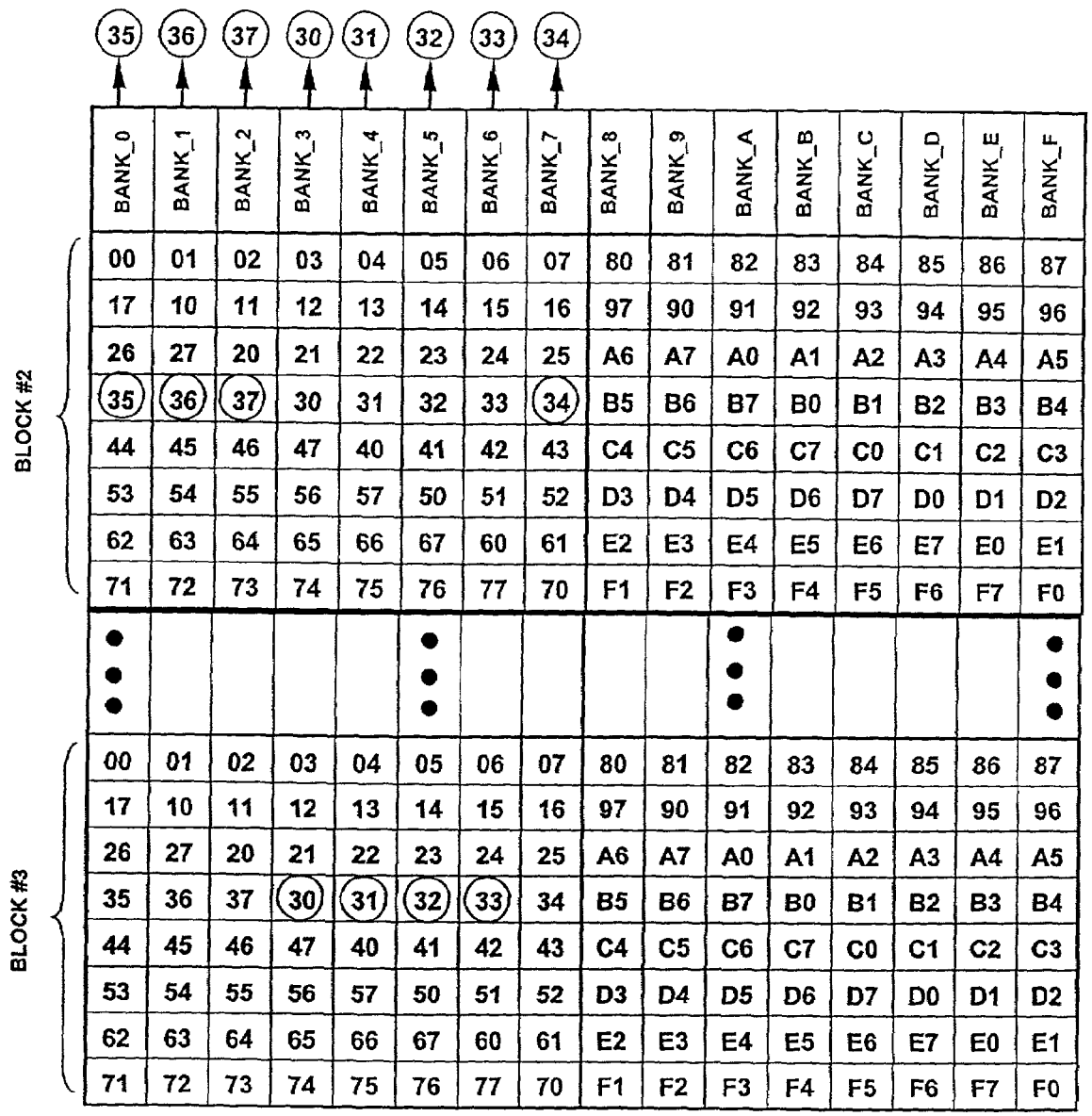
FIG. 12 is a diagram illustrating the needed new row data across 2 blocks (block #2 and block #3) for the search position of FIG. 11.

FIG. 11 illustrates the case that the row data (30, 31, 32, 33, 34, 35, 36, 37) for the reference block come from block #2 (34, 35, 36, 37) and block #3 (30, 31, 32, 33). FIG. 12 illustrates the parallel accessibility of the column data corresponding to the new row in FIG. 11. FIG. 10 and FIG. 12 also reveal the need of a block select signal that will select the correct block data for each memory bank.

Figure 13:
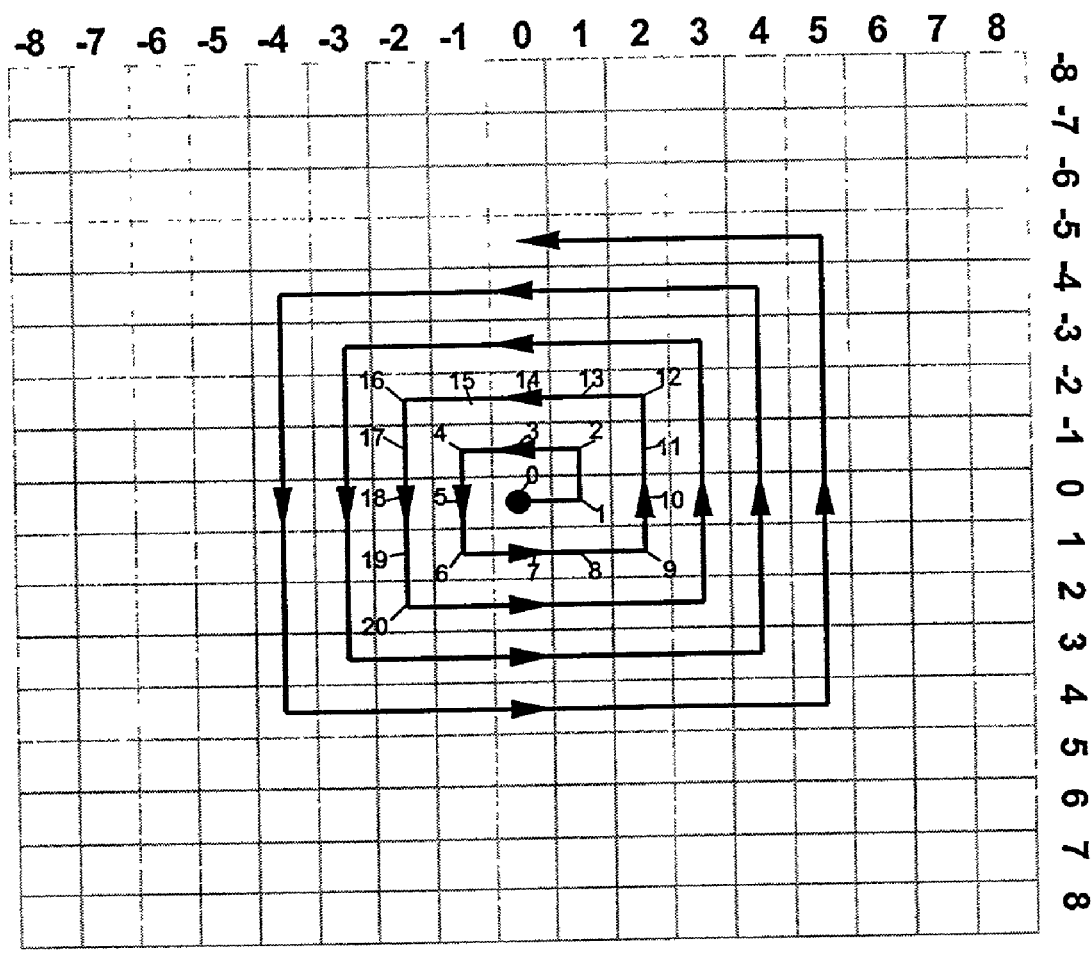
FIG. 13 is a diagram illustrating the order of initial search locations for the 1717 spiral search.

In order to take the advantage of this efficient column and row data access, a search pattern is needed to allow the movement by 1 pixel horizontally or vertically at a time. If the search window is square, a spiral pattern can be used that has the desired 1 pixel at a time feature and visits every pixel in the window exactly once. FIG. 13 illustrates the first few locations of a search pattern that covers the every pixel of an entire 17×17 window, corresponding to a search from −8 to +8 pixels horizontally and vertically. In this case, the block size of 8×8 has been assumed according to the above discussion on memory banks. The pixel locations at the center of each shifted search window have been labeled for the first 20 locations. The search pattern can be flipped horizontally or vertically and still preserves the 1 pixel move at a time feature.

Figure 14:
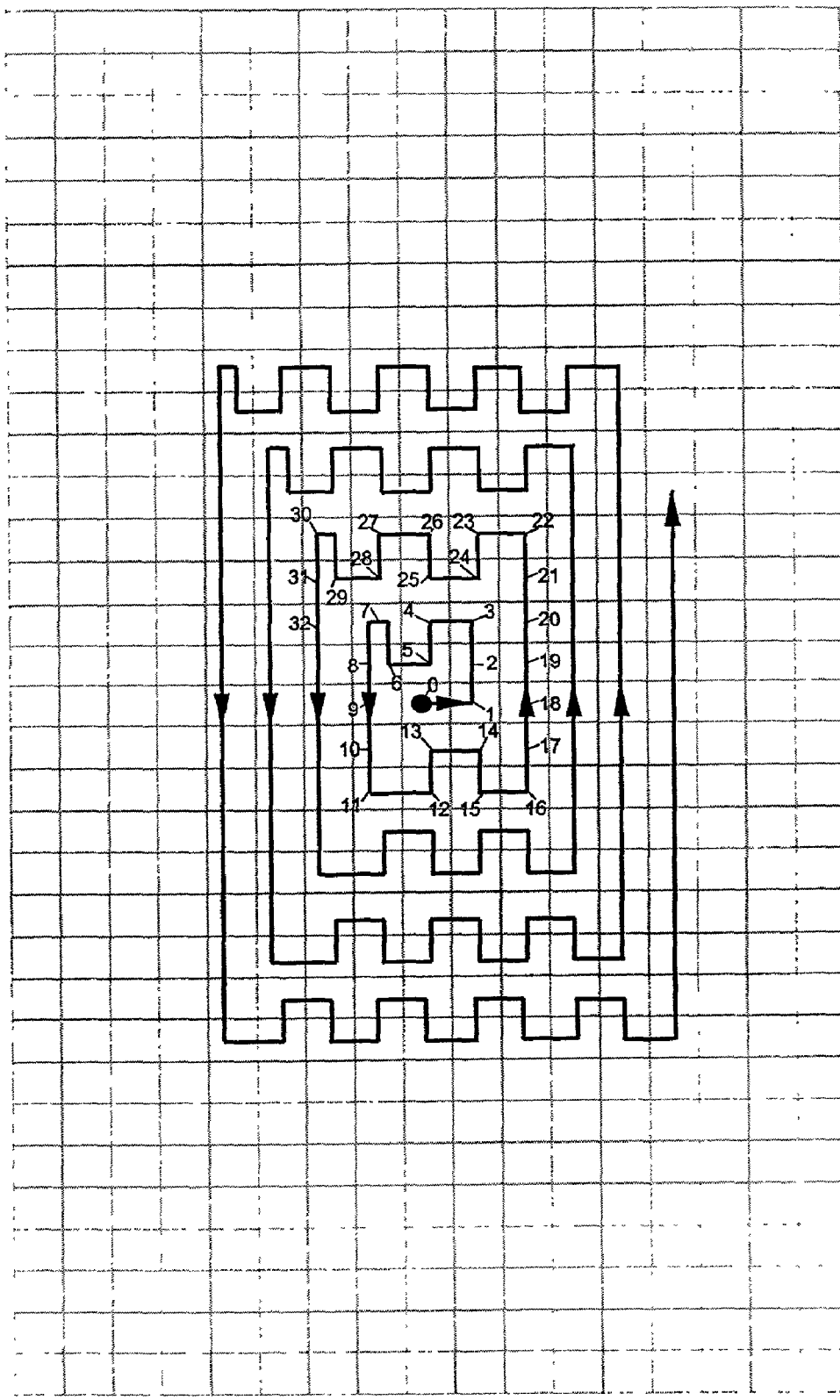
FIG. 14 is a diagram illustrating the order of initial search locations for the 1733 spiral search.

For a rectangular search window, where the search distance in one direction is multiple times the distance in the other direction, the original spiral pattern can be modified to accommodate the requirement. FIG. 14 illustrates the first few locations of a search pattern for a 17×33 search window, corresponding to search from −8 to +8 pixels horizontally and −16 to +16 pixels vertically. Since there are twice as many locations to be searched in the vertical direction as in the horizontal direction, the search pattern has to zig-zag its way vertically by 3 pixels on the horizontal segments of the spiral pattern. The first 31 center pixels locations have been labeled. As can be seen, to cover the search area, yet move only one pixel at a time, requires, for each loop of the spiral pattern, two corner locations to be searched twice. For example, locations 6 and 8 are the same, as are 29 and 31. Doing the redundant search is simpler and faster than modifying how the memory is loaded for these positions. Similarly, this pattern can be extended to the case that the vertical search distance is 3 times as large as the horizontal distance by zig-zagging its way vertically by 3 pixels on the horizontal segments of the spiral pattern.

While the search distance illustrated above is always in multiples of block size, it does not have to be that way. For example, instead of searching from −8 to +8 pixels horizontally and vertically, we may only search from −7 to +7 pixels. In this case, the pixels stored in the memory banks corresponding to the outmost columns and rows will never be used for motion estimation. Therefore, slight memory efficiency may be lost. Nevertheless, as long as the search distance is just slightly smaller than a multiple of the block size, the memory efficiency loss should be very modest. In U.S. Pat. No. 6,195,389 by Rodriguez, et al, a diamond shaped search pattern was described that minimized the search space for their two-phase method. There is a slight similarity for the first few search steps because both search patterns have the same spiral pattern. However, after the first few steps, the prior art in U.S. Pat. No. 6,195,389 becomes a diamond shaped pattern that loses the characteristic of moving only 1 pixel horizontally or vertically at each step. Furthermore, the diamond shaped pattern does not cover the complete search window and cannot be used for a full search. Therefore, the search pattern in U.S. Pat. No. 6,195,389 can not meet the requirements of the present invention.

For nature videos, it has been found in many studies that the motion vector has a symmetrical probability distribution with a peak at zero and falls off rapidly when it moved away from the center. The spiral search pattern starts the search from the center and moves gradually outward. Therefore, a good match can often be achieved during the early stages of the search. A good match is indicated by a very small block difference. Consequently, a threshold value can be chosen as a criterion to terminate further searching if the block difference is smaller than this threshold. The threshold value should be properly chosen. A value too small may lead to a mostly full search through the entire region because the criterion may never be met. On the other hand, a value too large may result in too many false early terminations because the criterion is so easy to meet. Proper values should be chosen based on experiments using some typical video sequences at targeted bit rates and the empirical values should be employed thereafter.

Based on the above description, the advantages of this invention become evident. The combination of the memory banks associated with data reorder control and the address translation control, 2D shift registers, and the spiral search pattern provides an efficient memory access for high-speed motion estimation while conserving power consumption.

As will be understood by those of skill in the art, the present invention may be embodied in alternate forms without departing from the essential characteristics thereof. For example, the memory could be arranged to allow a diagonal line to be read out in parallel for a diagonal search pattern, rather than horizontal and vertical. Accordingly, the foregoing description is intended to be illustrative, but not limiting, of the scope of the invention which is set forth in the following claims.

What is claimed is:

1. A method comprising:
   retrieving a block of pixels associated with a reference block from a reference frame memory; wherein said block of pixels includes N×M pixels wherein N represents the number of pixels in each row of the reference block and wherein M represents the number of pixels in each column of the reference block; and
   storing said N×M pixels in a staging memory wherein said N×M pixels are rearranged and stored in the staging memory so as to form P groups each having L pixels such that during each read access cycle all L pixels of a different single one of the P groups is read from the staging memory to a temporary memory; wherein at least one of the P groups of L pixels corresponds to a new row of said block of pixels and at least one of the P groups of L pixels corresponds to a new column of said block of pixels.

2. The method of claim 1 wherein said temporary memory is coupled to a processing unit for comparing said block of pixels to a second block of pixels.

3. The method of claim 2 wherein said processing unit performs a comparison for a motion estimation algorithm.

4. The method of claim 1 wherein said N×M pixels are rearranged such that pixels of one of said new row and new column are stored in the staging memory in a sequential pattern and pixels of the other one of said new row and new column are stored in the staging memory in a non-sequential pattern.

5. The method of claim 1 wherein said staging memory comprises banks of memories, each bank providing a different one of P groups of pixels.

6. The method of claim 5 wherein the L pixels of each group is one of a row and column of rearranged pixels.

7. The method of claim 1 further comprising providing a search pattern that is executed by loading said temporary memory, in a single cycle, with pixels to provide a next block to be searched.

8. The method of claim 7 wherein said search pattern is one of a spiral, horizontal and vertical search pattern.

9. The method of claim 1 wherein said rearranging of said pixels comprises reordering said pixels in each row so that pixels from a single column are spread across a plurality of columns so that they are accessed in parallel.

10. An apparatus comprising:
    a reference frame memory for storing a block of pixels associated with a reference block; wherein said block of pixels includes N×M pixels wherein N represents the number of pixels in each row of the reference block and wherein M represents the number of pixels in each column of the reference block; and;
    a staging memory for storing said N×M pixels; and
    an address translator for rearranging said N×M pixels retrieved from said reference frame memory so as to form P groups each having L pixels for storing in said staging memory such that during each read access cycle all L pixels of a different single one of the P groups is read from the staging memory to a temporary memory; wherein at least one of the P groups of L pixels corresponds to a new row of said block of pixels and at least one of the P groups of L pixels corresponds to a new column of said block of pixels;

an addressing unit for providing said block of pixels in parallel from said staging memory to said temporary memory.

11. The apparatus of claim 10 wherein said staging memory comprises a plurality of memory banks, each bank providing a different one of said P groups.

12. The apparatus of claim 10 wherein said staging memory comprises SRAM memory.

13. The apparatus of claim 10 wherein said temporary memory is a two-dimensional shift register, and wherein the L pixels in each of the P groups corresponds to a new row or column of said block of pixels.

14. The apparatus of claim 13 further comprising:
a plurality of buffers coupled to said two dimensional shift register for buffering new rows and columns of pixels to be shifted in from the left, right, top and bottom.

15. The apparatus of claim 10 wherein said temporary memory is coupled to a processing unit for comparing said block of pixels to a second block of pixels.

16. The apparatus of claim 15 wherein said processing unit performs a comparison for a motion estimation algorithm.

17. The apparatus of claim 10 wherein said N×M pixels are rearranged such that pixels of one of said new row and new column are stored in the staging memory in a sequential pattern and pixels of the other one of said new row and new column are stored in the staging memory in a non-sequential pattern.

18. A method comprising:

retrieving a block of pixels associated with a reference block from a reference frame memory, wherein the block of pixels includes a first plurality of rows of pixels and a second plurality of columns of pixels, wherein the block of pixels further includes a plurality of groups of pixels each having a plurality of pixels; and storing the pixels of the block in a staging memory in a rearranged form;

wherein, according to the rearranged form, all pixels of any one of the plurality of groups of pixels is read during a single read cycle from the staging memory to a temporary memory, wherein each group of some of the plurality of groups of pixels corresponds to a new row and each group of some other of the plurality of groups of pixels corresponds to a new column.

19. The method of claim 18 wherein said rearranged form is such that pixels of one of said new row and new column are stored in the staging memory in a sequential pattern and pixels of the other one of said new row and new column are stored in the staging memory in a non-sequential pattern.

* * * * *